(12) United States Patent
Dillon et al.

(10) Patent No.: US 12,274,206 B2
(45) Date of Patent: Apr. 15, 2025

(54) UNIVERSAL CROP HEAD ASSEMBLY AND ITS USE IN HARVESTING CROPS

(71) Applicant: Tribine Industries LLC, Logansport, IN (US)

(72) Inventors: Ben N. Dillon, Logansport, IN (US); Dillon M. Thompson, Burdett (UA)

(73) Assignee: Tribine Industries, LLC, Logansport, IN (US)

( * ) Notice: Subject to any disclaimer, the term of this patent is extended or adjusted under 35 U.S.C. 154(b) by 423 days.

(21) Appl. No.: 17/813,054

(22) Filed: Jul. 18, 2022

(65) Prior Publication Data
US 2023/0026343 A1    Jan. 26, 2023

Related U.S. Application Data

(60) Provisional application No. 63/224,993, filed on Jul. 23, 2021.

(51) Int. Cl.
*A01D 47/00*        (2006.01)
*A01D 34/14*        (2006.01)
(Continued)

(52) U.S. Cl.
CPC .......... *A01D 45/021* (2013.01); *A01D 34/14* (2013.01); *A01D 34/28* (2013.01); *A01D 47/00* (2013.01); *A01D 57/03* (2013.01); *A01D 57/04* (2013.01)

(58) Field of Classification Search
CPC ........ A01D 47/00; A01D 34/02; A01D 34/03; A01D 34/14; A01D 34/28; A01D 80/02; A01D 45/021; A01D 57/03; A01D 57/04
See application file for complete search history.

(56) References Cited

U.S. PATENT DOCUMENTS

| 1,509,403 | A | 9/1924 | Howard et al. |
| 2,749,696 | A | 6/1956 | Innes |
| (Continued) | | | |

FOREIGN PATENT DOCUMENTS

| CN | 20514892 | 4/2016 |
| CN | 204616415 | 5/2021 |
| (Continued) | | |

OTHER PUBLICATIONS

International Search Report and Written Opinion for PCT App. No. PCT/US23/72687 mailed Dec. 14, 2023.
(Continued)

*Primary Examiner* — Adam J Behrens
(74) *Attorney, Agent, or Firm* — Emerson, Thomson & Bennett, LLC; Roger D. Emerson; Peter R. Detorre

(57) ABSTRACT

A universal crop head assembly is carried at the front of and by a harvester. The new crop head assembly includes a frame assembly, an intermediate multi-crop reel assembly carried by the frame assembly and having selectively extendable and retractable fingers for small grain harvesting. A lower cutter bar assembly is carried by the frame assembly and for cutting grain stalks. An upper forward cutter bar assembly is carried by the frame assembly and supports an upper cutter bar for cutting corn stalks about an upper end, an adjustable air knife assembly for blowing against severed corn stalks upper ends; and a lower draper belt assembly carried by the frame assembly and for moving grain cut by the lower cutter bar assembly.

12 Claims, 6 Drawing Sheets

(51) Int. Cl.
*A01D 34/28* (2006.01)
*A01D 45/02* (2006.01)
*A01D 57/03* (2006.01)
*A01D 57/04* (2006.01)

(56) References Cited

U.S. PATENT DOCUMENTS

| | | | |
|---|---|---|---|
| 2,867,962 A | 1/1959 | Meyer | |
| 3,399,517 A * | 9/1968 | Magee | A01D 47/00 56/238 |
| 3,508,387 A * | 4/1970 | Wright | A01D 41/14 56/95 |
| 3,662,525 A | 5/1972 | White | |
| 3,680,291 A | 8/1972 | Soteropulos | |
| 3,710,564 A * | 1/1973 | Sammann | A01D 47/00 171/58 |
| 4,215,527 A | 8/1980 | Shriver et al. | |
| 4,317,326 A | 3/1982 | Riedinger | |
| 4,590,739 A | 5/1986 | Abatti et al. | |
| 4,890,447 A * | 1/1990 | Grandinetti | A01D 47/00 56/63 |
| 4,910,946 A | 3/1990 | Underwood | |
| 5,255,500 A | 10/1993 | von Allwoerden | |
| 5,433,065 A * | 7/1995 | Mosby | A01D 41/14 56/238 |
| 5,440,865 A | 8/1995 | Hale | |
| 5,482,508 A | 1/1996 | Redekop et al. | |
| 6,012,272 A | 1/2000 | Dillon | |
| 6,125,618 A | 10/2000 | Dillon | |
| 6,233,911 B1 | 5/2001 | Dillon | |
| 6,339,917 B1 | 1/2002 | Dillon et al. | |
| 6,547,169 B1 | 4/2003 | Matousek et al. | |
| 6,598,812 B1 | 7/2003 | Matousek et al. | |
| 6,604,995 B2 | 8/2003 | Dillon et al. | |
| 6,606,804 B2 | 8/2003 | Dillon et al. | |
| 6,615,570 B2 | 9/2003 | Beck et al. | |
| 6,616,528 B2 | 9/2003 | Wolters et al. | |
| 6,826,894 B2 | 12/2004 | Thiemann et al. | |
| 6,910,845 B2 | 6/2005 | Dillon | |
| 7,143,863 B2 | 12/2006 | Dillon | |
| 7,222,474 B2 | 5/2007 | Rayfield et al. | |
| 7,553,228 B2 | 6/2009 | Dillon | |
| 7,555,884 B2 | 7/2009 | Janning | |
| 8,220,236 B1 * | 7/2012 | Benner | A01D 45/003 56/63 |
| 9,452,512 B2 | 9/2016 | Joyce | |
| 9,485,908 B2 * | 11/2016 | Verhaeghe | A01D 34/54 |
| 9,554,510 B2 * | 1/2017 | Nürnberg | A01D 41/14 |
| 9,723,773 B2 | 8/2017 | Jordan | |
| 9,844,184 B2 | 12/2017 | Johnson et al. | |
| 9,848,530 B2 | 12/2017 | Borry | |
| 9,980,432 B2 * | 5/2018 | van Vooren | A01D 69/03 |
| 10,045,488 B2 | 8/2018 | Matousek | |
| 10,237,371 B2 | 3/2019 | Dillon | |
| 10,238,038 B2 | 3/2019 | Matousek et al. | |
| 10,244,685 B2 | 4/2019 | Matousek et al. | |
| 10,257,977 B2 | 4/2019 | Nelson et al. | |
| 10,292,333 B2 * | 5/2019 | Missotten | A01D 41/144 |
| 10,321,628 B2 * | 6/2019 | Borry | A01D 47/00 |
| 10,321,630 B2 | 6/2019 | Talbot et al. | |
| 10,412,890 B2 | 9/2019 | Dunn et al. | |
| 10,477,763 B2 * | 11/2019 | Jonckheere | A01D 41/141 |
| 10,681,868 B2 | 6/2020 | Dietrich et al. | |
| 11,744,183 B2 * | 9/2023 | Tang | A01D 57/025 56/220 |
| 2002/0011057 A1 | 1/2002 | Dillon | |
| 2003/0109294 A1 | 6/2003 | Wolters et al. | |
| 2004/0014511 A1 | 1/2004 | Johnson et al. | |
| 2006/0254237 A1 | 11/2006 | Ricketts et al. | |
| 2007/0209347 A1 * | 9/2007 | Malmros | A01D 41/08 56/126 |
| 2014/0262370 A1 | 9/2014 | Kohn et al. | |
| 2018/0014462 A1 * | 1/2018 | Borry | A01D 41/142 |
| 2019/0350124 A1 | 11/2019 | Pitt | |
| 2020/0060078 A1 | 2/2020 | Kolte et al. | |
| 2020/0100418 A1 | 4/2020 | Kornecki et al. | |
| 2020/0187413 A1 | 6/2020 | Parson et al. | |
| 2020/0253120 A1 * | 8/2020 | Hefner | A01D 34/42 |
| 2021/0127552 A1 | 5/2021 | Hubner et al. | |
| 2023/0104234 A1 | 4/2023 | Dillon et al. | |
| 2024/0276918 A1 * | 8/2024 | Baert | A01D 69/03 |

FOREIGN PATENT DOCUMENTS

| | | | |
|---|---|---|---|
| DE | 202021001628 | 9/2015 | |
| EP | 0640276 | 3/1995 | |
| EP | 3155888 A1 * | 4/2017 | A01D 41/06 |
| WO | 2006074667 | 7/2006 | |

OTHER PUBLICATIONS https://www.yetterco.com/products/11-plantermount-row-cleaners, "2967 Screw Adjust Row Cleaner", Aug. 31, 2021.

* cited by examiner

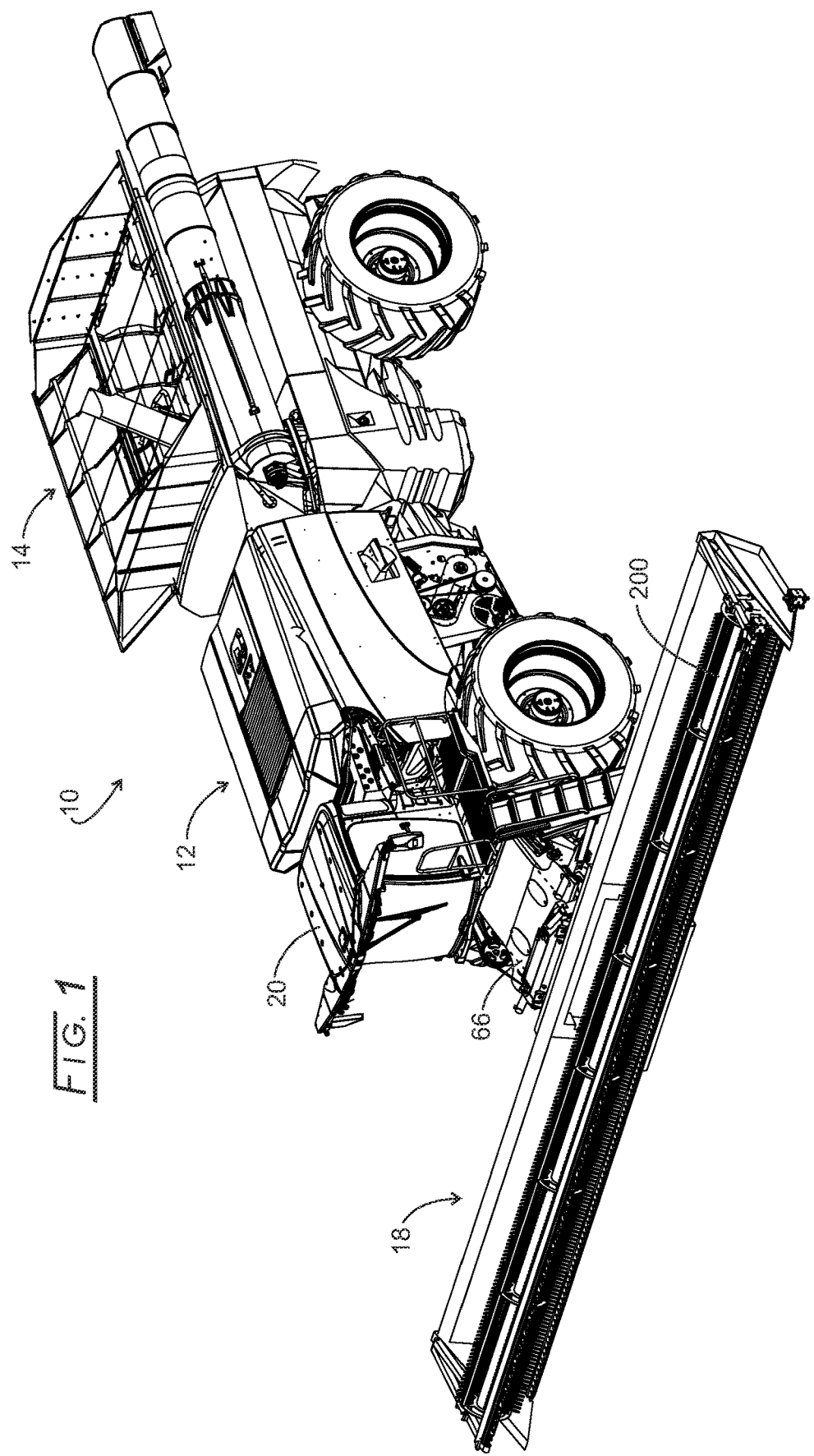

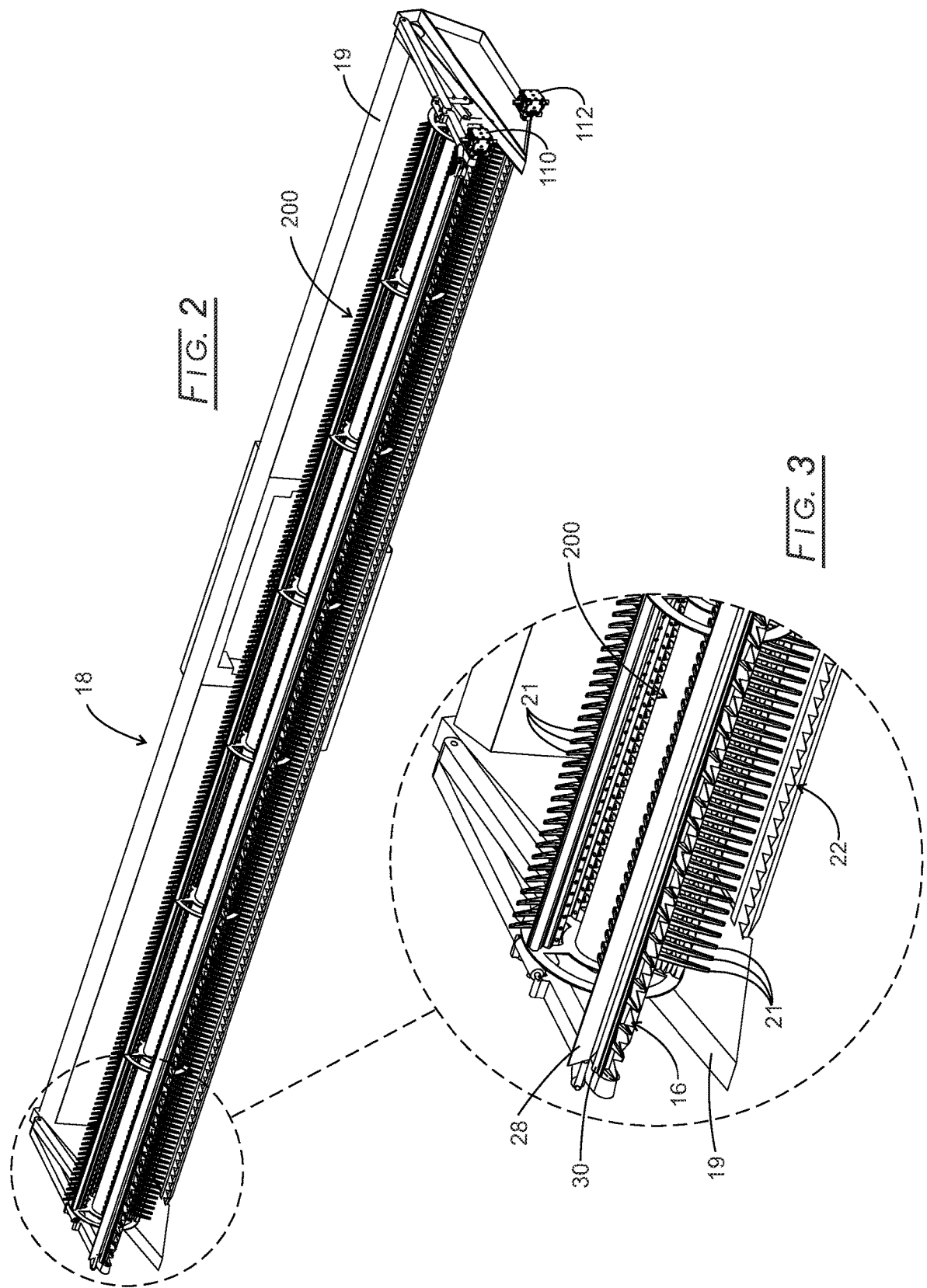

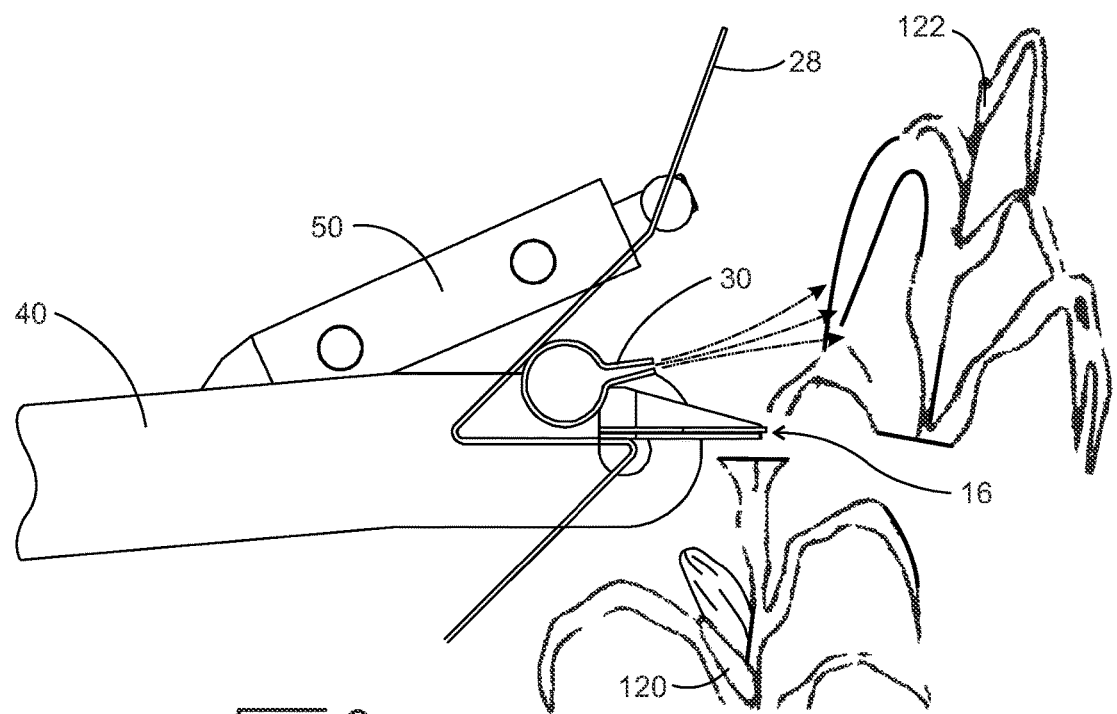
FIG. 8
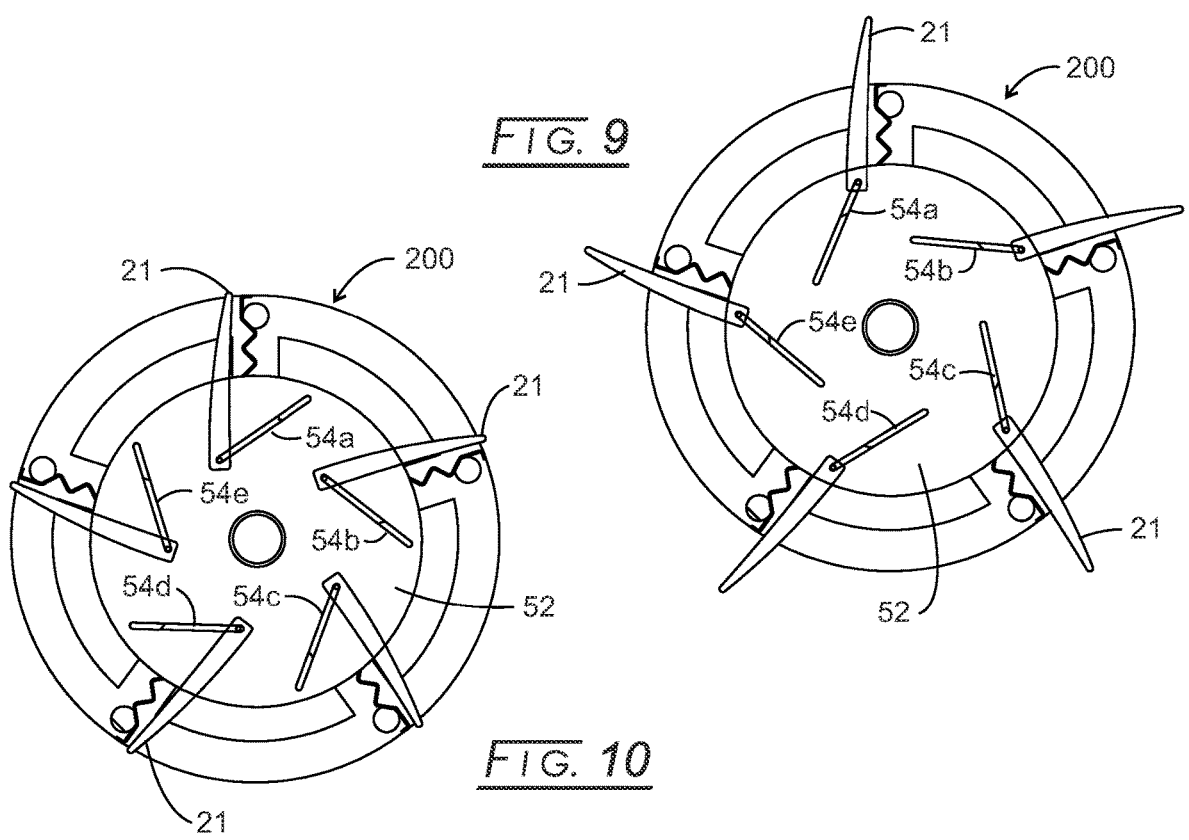
FIG. 9
FIG. 10

UNIVERSAL CROP HEAD ASSEMBLY AND ITS USE IN HARVESTING CROPS

CROSS-REFERENCE TO RELATED APPLICATIONS

This application claims benefit of U.S. Provisional No. 63/224,003 filed on Jul. 23, 2021.

STATEMENT REGARDING FEDERALLY SPONSORED RESEARCH AND DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM

Not applicable.

STATEMENT REGARDING PRIOR DISCLOSURES BY THE INVENTOR OR A JOINT INVENTOR

Not applicable.

BACKGROUND OF THE INVENTION

The present disclosure relates to crop harvesting headers and more particularly to a header assembly that harvests both small grain and large grain.

Field crops, such as, for example, wheat, corn, and soybeans, generally are harvested by a machine that includes a crop gathering and feeding mechanism, a threshing and cleaning section, an operator's cab, and a tank to carry the clean grain to the end of the field. Historically, the gathering and feeding of corn ears has been done by a row crop specific mechanism generally referred to as a corn head that does not cut off the corn stalk, but rather strips the corn ear off the stalk and conveys it into the feeding and threshing section of the machine. Small grain crops, such as, for example, wheat or soybeans, typically have been cut at a specific height below the grain pods or plant head and the plant including some of the stalk fed into the threshing section of the machine. The plants typically are cut by a reciprocating sectional knife called a sickle. This prevailing harvesting method results in two separate and distinctly different crop gathering and feeding mechanisms, commonly called Heads or Headers or Cutter bars. A typical width for currently utilized crop gathering heads is 40'.

The crop gathering reels of the Heads historically and typically have been used to pick up and push small grain plants such as wheat into a cutter mechanism such as a sickle. The reel also pushes the cut plant onto a conveying mechanism such as a belt or auger which moves it to the feeding section of the grain head where it is fed to the threshing section of the harvester. Reel mechanisms have only been recently used in corn harvesting to assist feeding of cornstalks that have been blown down by wind. Virtually all corn harvesting for grain is done by using horizontally deployed counter rotating rollers to jerk the corn stalk downward between two spaced apart adjustable plates which strip the grain bearing ear of corn off the stalk. Most of the stalk is intentionally left on the ground.

The periphery of most reels designed to handle small grains such as wheat consists of a series of spaced apart fingers attached to typically round cross members of the reel assembly. The typically curved fingers are useful to pick up plants that have been blown from a vertical position and feed them into the cutter bar and then onto the conveying means. The fingers would not be as useful in corn harvesting as they would tend to strip the ears off the stalk and onto the ground.

The present disclosure goes to a single grain head that can handle both large grains and small grains.

BRIEF SUMMARY OF THE INVENTION

The disclosed crop head gathers multiple crops, including corn or Maize, and feeds them into the threshing section of the harvester utilizing a single crop head mechanism. The new universal head results in a major capital reduction for the crop grower or contract harvester. It also allows the grower to plant corn in different row widths because the new cutting technique does not require a specific row width as current ear stripping machines do. Current corn heads are sold as a specific number of rows such as 12 or 16 with a specific row spacing, such as, 30 inches.

The present invention employs two crop cutting means with one option being sickles. One cutter is disposed in the conventional position of a small grain head. The second cutter is positioned above and forward of the primary cutter. The secondary cutter can be moved by the operator to change its relative position to the crop and the primary cutter. The secondary cutter can be stowed and not used in the harvesting process.

In the case of corn harvesting, both cutters are used. The secondary cutter contacts the corn stalk first and cuts it off just above the ear and the fodder falls to the ground. The primary cutter and a conventional reel contact the corn stalk next. The cutter engages the stalk and cuts it off just below the ear. The ears and attached short stalk section are induced by the reel to fall onto a conveying means such as a draper belt. The conveying means moves the short stalks and ears to the feeding means where they are fed into the threshing section.

The corn stalk left standing optionally can be crushed and cut by a roller disposed rearward of the primary cutter but in front of the tires.

In the case of the universal head assembly, the fingers would be attached to the back of a flat faced member called a bat. In small grain harvest the fingers would be positioned perpendicular to their bat and extend beyond the leading edge of the bat to perform their useful function. In the case of corn harvesting the fingers as a group would be turned on their rotatable mount to be parallel to the bat and therefore not exposed to the crop. The front surface of the bat, which may be flat or shaped, would urge the corn stalk into the primary lower cutter mechanism and onto the conveying mechanism. In one embodiment, the bat would be "D" shaped with a flat surface on the back to mount the fingers and a round surface on the front to push the crop rearward without jerking up or down. This methodology is not limited to corn.

A universal crop head assembly is carried at the front of and by a harvester. The new crop head assembly includes a frame assembly, an intermediate multi-crop reel assembly carried by the frame assembly and having selectively extendable and retractable fingers for small grain harvesting. A lower cutter bar assembly is carried by the frame assembly and for cutting grain stalks. An upper forward cutter bar assembly is carried by the frame assembly and supports an upper cutter bar for cutting corn stalks about an upper end, an adjustable air knife assembly for blowing against severed corn stalks upper ends; and a lower draper belt assembly carried by the frame assembly and for moving grain cut by the lower cutter bar assembly.

BRIEF DESCRIPTION OF THE SEVERAL VIEWS OF THE DRAWINGS

For a fuller understanding of the nature and advantages of the present method and process, reference should be had to the following detailed description taken in connection with the accompanying drawings, in which:

FIG. 1 is an isometric view of an articulated harvester equipped with the disclosed universal crop head assembly;

FIG. 2 is an isometric view of the reel of the disclosed universal crop head assembly FIG. 1;

FIG. 3 is an exploded view of the reel at one end of the universal crop head assembly of FIG. 2;

FIG. 8 a side view of the upper cutter bar assembly showing the upper cutter bar and air knife in operation cutting a corn stalk;

FIG. 9 is side view of the crop reel assembly with its fingers extended to fit between the fingers guide assembly;

FIG. 10 is side view of the crop reel assembly with its fingers retracted to fit between the fingers guide assembly;

The drawings will be described in more detail below.

DETAILED DESCRIPTION OF THE INVENTION

Multiple crops, including corn or Maize, are harvested (cut) and fed into the threshing section of the harvester utilizing a single mechanism. The new universal head assembly results in a major capital reduction for the crop grower or contract harvester. It also allows the grower to plant corn in different row widths because the new cutting technique does not require a specific row width as current ear stripping machines do. Current corn heads are sold as a specific number of rows such as, for example, 12 or 16 with a specific row spacing such as, for example, 30 inches.

Referring now to FIG. 1, an articulated harvester, 10, consists of a powered PPU, 12, a rear grain cart, 14, and an articulation joint (not shown) that connects PPU 12 with rear grain cart 14. PPU 12 carries a universal crop head assembly, 18, operator's cab, 20, grain cleaning and handling assembly, and engines. PPU 12 is devoid of any grain storage, such being exclusive in rear grain cart 14. While both PPU 12 and rear grain cart 14 are shown being carried by wheel assemblies, one or both could be tracked. Universal crop head assembly 18 is carried by a feedhouse assembly, 66, such as that as described in U.S. Pat. No. 10,426,089.

Referring now also to FIGS. 2 and 3, universal crop head assembly 18 employs two crop cutting assemblies with one option being sickles (described later) and the second being a conventional reel assembly, 200, that has retractable/extendable rows of fingers, as illustrated by fingers, 21 (see also FIGS. 9 and 10). The fingers are extended for small gains and retracted for corn.

Figure 4:
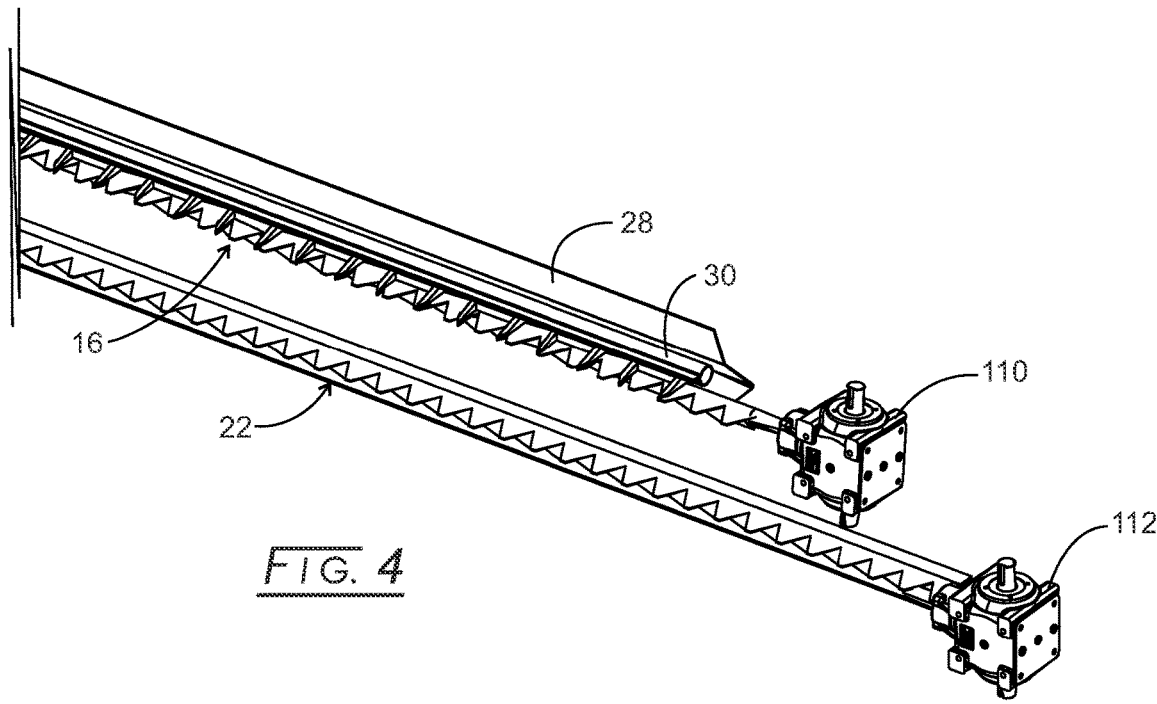
FIG. 4 is an isometric view of the two sickle assemblies located within the disclosed universal crop head assembly.
Figure 5:
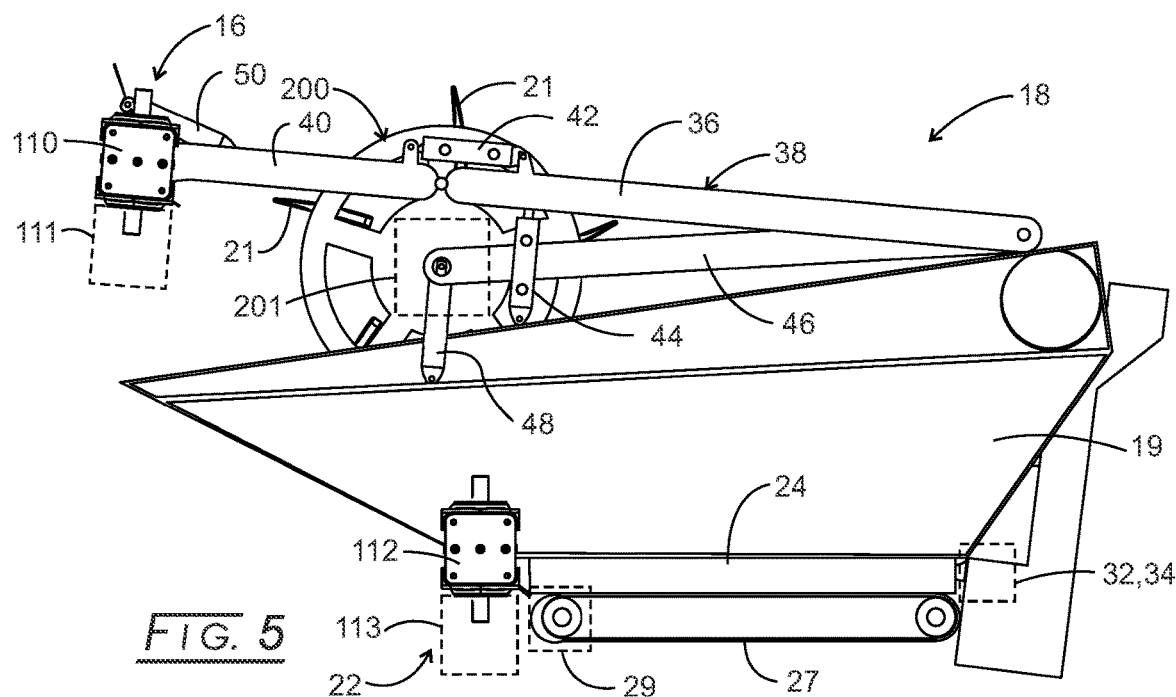
FIG. 5 is a side view of the disclosed universal crop head assembly.

Referring now also to FIGS. 4 and 5, the reciprocating sickles cutting option is seen to include a lower primary cutter bar assembly, 22, and an upper cutter bar assembly, 16. Lower primary cutter bar assembly 22 is located in the conventional position as a small grain head. Upper cutter bar assembly 16 can be vertically moved by the operator to change its relative height relative to the crop and primary cutter assembly 22. Secondary cutter assembly 16 can be stowed and not used in the harvesting process. Their relative locations are seen in FIG. 5 along with a frame assembly, 19, draper belt assemblies, 24 and 25, for moving cut crop towards conveyor belt assembly, 27, which in turn feeds cut crop to a fingered auger assembly, 26, for moving cut crop into feedhouse 66.

Upper/lower cutter reciprocating gear boxes, 110 and 112, respectively, are seen to drive cutter bar assemblies 16 and 22, respectively. A hydraulic motor, 111, drives reciprocating gear box 110, while a hydraulic motor, 113, drives reciprocating gear box 112. Conventional reel assembly 200 is driven by a hydraulic motor assembly, 201 (see FIG. 5 also) and can be raised/lowered to adjust its height by a hydraulic cylinder, 48.

Upper cutter bar assembly 16 is carried at the end of an articulating arm assembly, 36. Articulating arm assembly 36 is formed from a bar, 40, that is pivotally connected to a bar, 38. Arm 38 in turn is pivotally connected to a bar, 46, that is connected to a hydraulic cylinder, 48, which adjusts the height of both reel assembly 200 and arm 46. Another hydraulic cylinder, 44, pivots arm 38 relative to arm 46, while a further hydraulic cylinder, 42, pivots arm 40 relative to arm 38. This arm and cylinder arrangement permits upper cutter bar assembly 200 to be located at various heights and to move upper cutter bar assembly to a home, non-cutting position when small grains are being harvested.

Looking to FIG. 8 additionally, upper cutter bar assembly 16 is seen severing a corn stalk top, 122, from a mid-section corn stalk, 120. A deflector plate assembly, 28, deflects any corn stalk tops away from cutter bar assembly 16 and to the side. An air knife assembly, 30, assists in moving cut corn stalk top 122 away from the cutter bar assembly to fall to the ground to be moved to the side.

Figure 6:
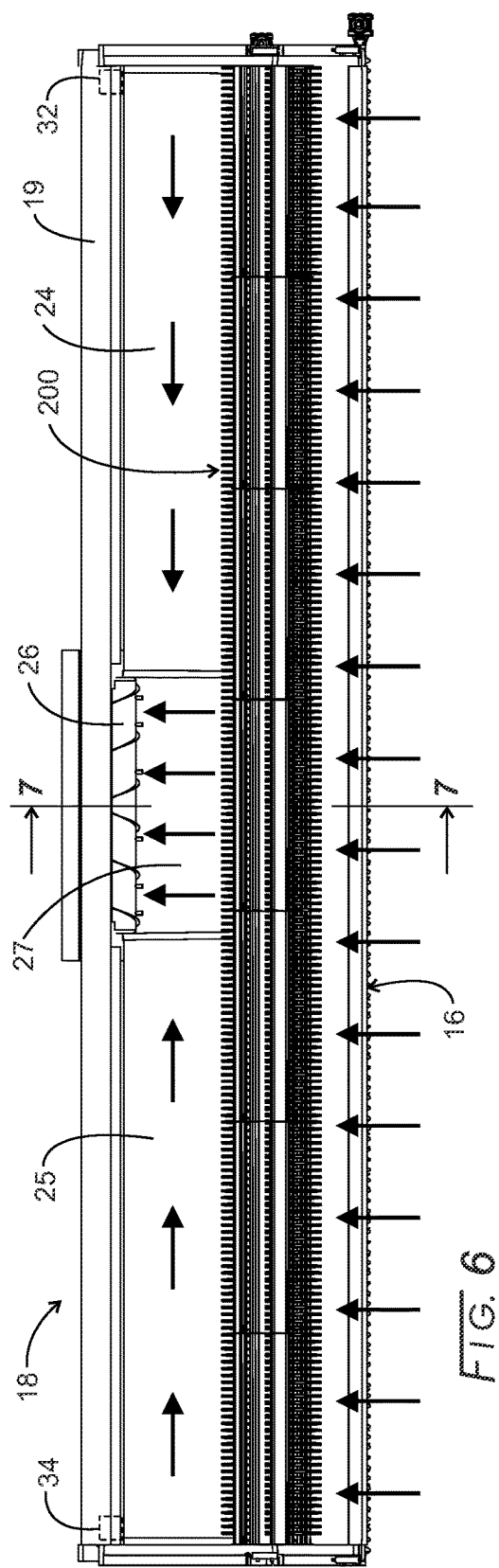
FIG. 6 is a top view of disclosed universal crop head assembly.
Figure 7:
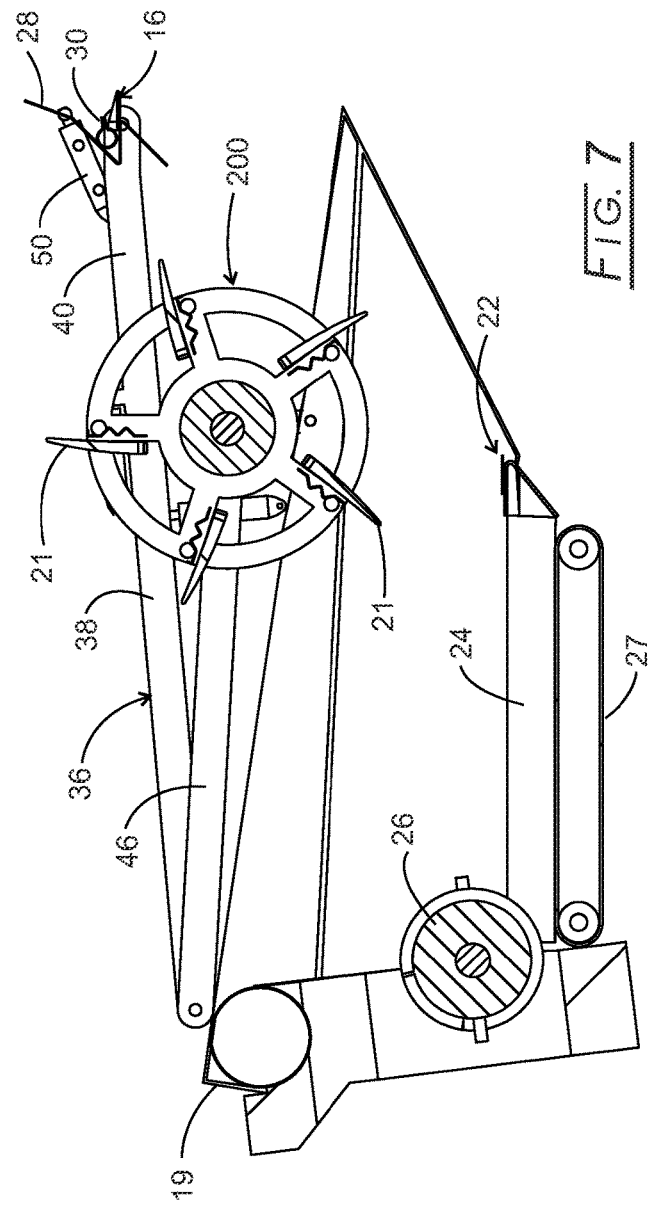
FIG. 7 is a view taken along line 7-7 of FIG. 6.
Figure 11:
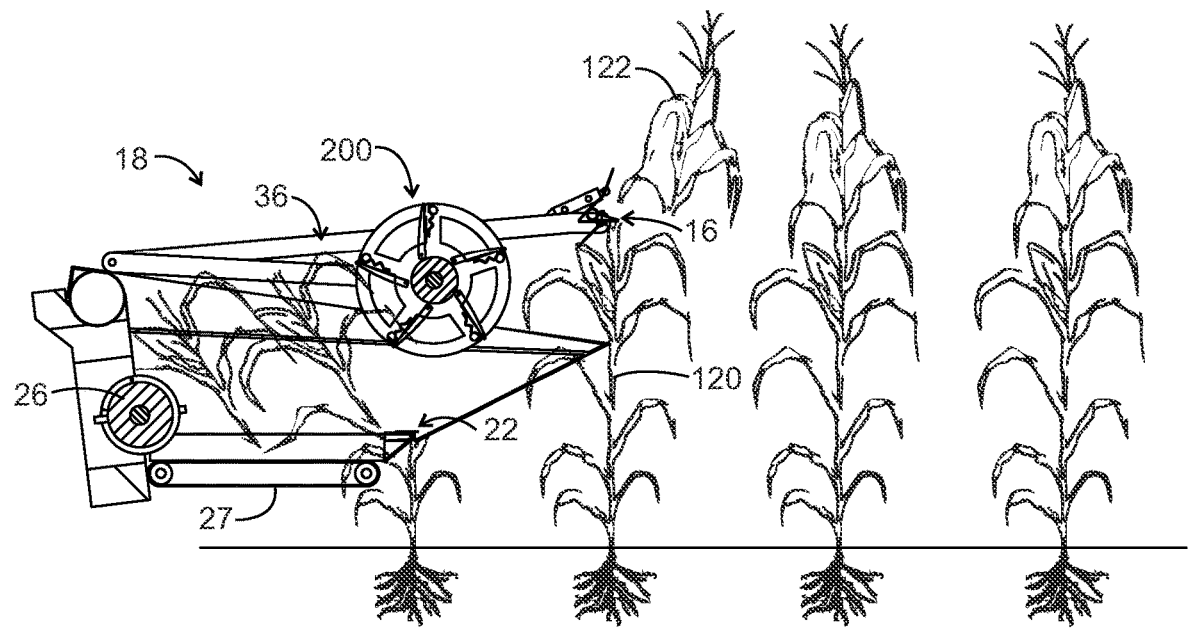
FIG. 11 is a side view of the universal head assembly confronting a row of corn for harvesting.
Figure 12:
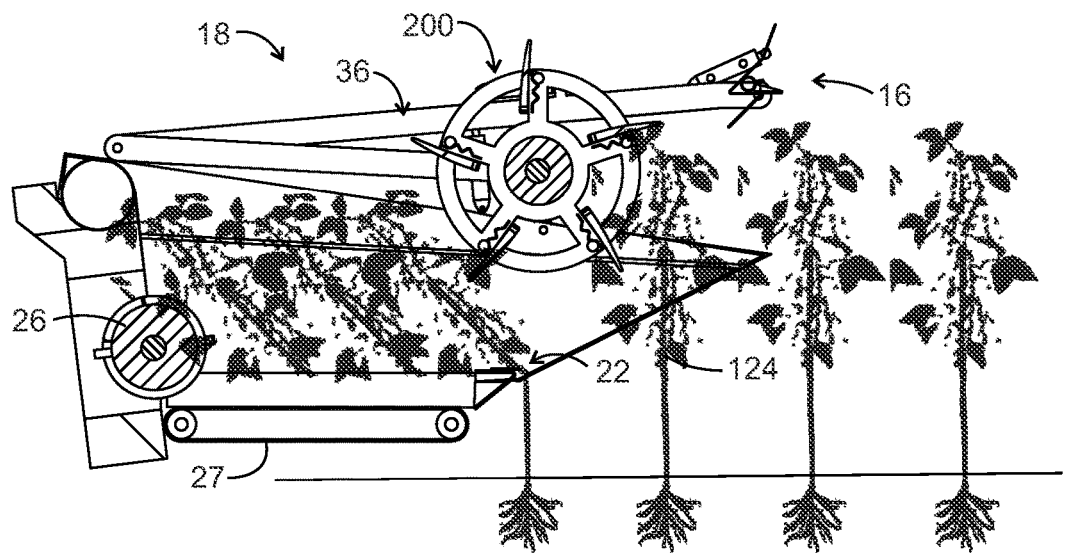
FIG. 12 is a side view of the universal head assembly confronting a row of soybeans for harvesting.

In the case of corn harvesting, both cutter assemblies are used. Secondary cutter assembly 16 contacts the corn stalk first and cuts it off just above the ear and the fodder falls to the ground, as is illustrated in FIGS. 11 and 12. Primary cutter assembly 22 and a conventional reel assembly, 200, having retractable/extendable fingers as illustrated by a finger, 21, contact the corn stalk next. Secondary cutter assembly 16 engages the stalk and cuts it off just below the ear. The ears and attached short stalk section are induced by reel assembly 200 to fall onto a conveying means, such as a draper belt assemblies, 24 and 25. Draper belt assemblies 24 and 25 move the short stalks and ears to belt assembly 27 and an auger assembly, 26 (see FIGS. 6 and 7), where they are fed into the threshing section of the harvester, as described above. The arrows in FIG. 6 show the flow of severed crop in universal crop head assembly 18. The corn stalk left standing optionally can be crushed and cut by a roller disposed rearward of the primary cutter, but in front of the tires.

Referring now to FIGS. 9 and 10, multi-crop reel assembly 200 is shown in more detail. In small grain harvest the fingers of rotatable finger assembly 200 would be in an extended position, as is illustrated in FIG. 9. A representative finger, 21, typifies the extendable fingers which can be greater or lesser number as the number shown in FIGS. 9 and 10. Cam slots, 54a-54e, let fingers 21 ride in them for extending the fingers (FIG. 9) and retracting the fingers (FIG. 10).

FIG. 11 shows universal crop head assembly 18 confronting a row of corn stalks, such as corn stalk 1200 for harvesting of the corn. It will be observed that the upper portion 122 of corn stalk 1200 has been cut by upper cutter bar assembly 16 and urged out of the way by air knife assembly 30. For a prior cornstalk, lower cutter bar assembly 22 is seen to have cut the corn stalk about its lower portion and the cornstalk fed into universal crop head assembly 18. Multi-crop reel assembly 200 is not involved in this operation.

FIG. 12 shows universal crop head assembly 18 confronting a grain row (wheat or the like). For this grain crop, upper cutter bar assembly 16 is not involved and can be shut down. Multi-crop reel assembly 200 is involved in this operation, o it is seen rotating to bring the grain into universal crop head assembly 18 so that lower cutter bar assembly 22 can cut the grain stalk about its lower end with multi-crop reel assembly 200 urging the cut grain and stalk into universal crop head assembly 18 for processing.

It should be understood that additional motive assemblies can be used in place of the hydraulic cylinders illustrated in the drawings. Too, chains or the like could connect various motors to one or multiple moving assemblies. The drawings just show one embodiment of these items. Those skilled in the art will readily envision additional methods/equipment for accomplishing the various tasks set forth herein.

While the apparatus, system, and method have been described with reference to various embodiments, those skilled in the art will understand that various changes may be made, and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

The invention claimed is:

1. A universal crop head assembly carried at the front of and by a harvester, which comprises:
   (a) a frame assembly;
   (b) an intermediate multi-crop reel assembly carried by the frame assembly and having fingers that are selectively extendable for small grain harvesting and retractable for corn harvesting;
   (c) a lower cutter bar assembly carried by the frame assembly and for cutting grain stalks;
   (d) an upper cutter bar assembly for corn harvesting carried by the frame assembly and supporting:
      (i) an upper cutter bar for cutting corn stalks about an upper end; and
      (ii) an adjustable air knife assembly for blowing against severed corn stalks upper ends; and
   (e) lower grain belt assemblies carried by the frame assembly and for moving cut grain to a feedhouse of a harvester.

2. The universal crop head assembly of claim 1, wherein the upper cutter bar assembly includes a deflector plate assembly for cut corn stalks.

3. The universal crop head assembly of claim 1, wherein a selectively height adjustable arm assembly carries the upper cutter bar assembly.

4. The universal crop head assembly of claim 1, wherein the height of the multi-crop reel assembly is adjustable for harvesting various crops.

5. The universal crop head assembly of claim 1, wherein the height of the lower cutter bar assembly is adjustable.

6. The universal crop head assembly of claim 1, wherein the height of the upper cutter bar assembly is adjustable.

7. Method for harvesting crops with a universal crop head assembly carried at the front of and by a harvester, which comprises the steps of:
   (a) adjusting the height of an intermediate multi-crop reel assembly carried by the frame assembly and having fingers that are selectively extendable for small grain harvesting and retractable for corn harvesting;
   (b) adjusting the height of a lower cutter bar assembly carried by the frame assembly and for cutting grain stalks;
   (c) adjusting the height of an upper cutter bar assembly for corn harvesting carried by the frame assembly and supporting:
      (i) an upper cutter bar for cutting corn stalks about an upper end; and
      (ii) an adjustable air knife assembly for blowing against severed corn stalks upper ends; and
   (d) moving the harvester across a crop field for harvesting of crop growing thereon.

8. The crop harvesting method of claim 7, wherein lower grain belt assemblies carried by the frame are actuating for moving cut grain to a feedhouse of the harvester.

9. The crop harvesting method of claim 7, wherein the crop is corn and the air knife assembly carried by the upper cutter bar assembly assists in moving cut corn stalk tops away therefrom.

10. The crop harvesting method of claim 9, wherein the fingers of the intermediate multi-crop reel assembly are retracted.

11. The crop harvesting method of claim 7, wherein the crop is a small grain and the upper cutter bar assembly is moved to a height above the small gain crop.

12. The crop harvesting method of claim 11, wherein the fingers of the intermediate multi-crop reel assembly are extended.

* * * * *